April 2, 1968 — M. ZEZULA — 3,376,006
SUSPENSION CLAMP DEVICE
Filed Sept. 19, 1966
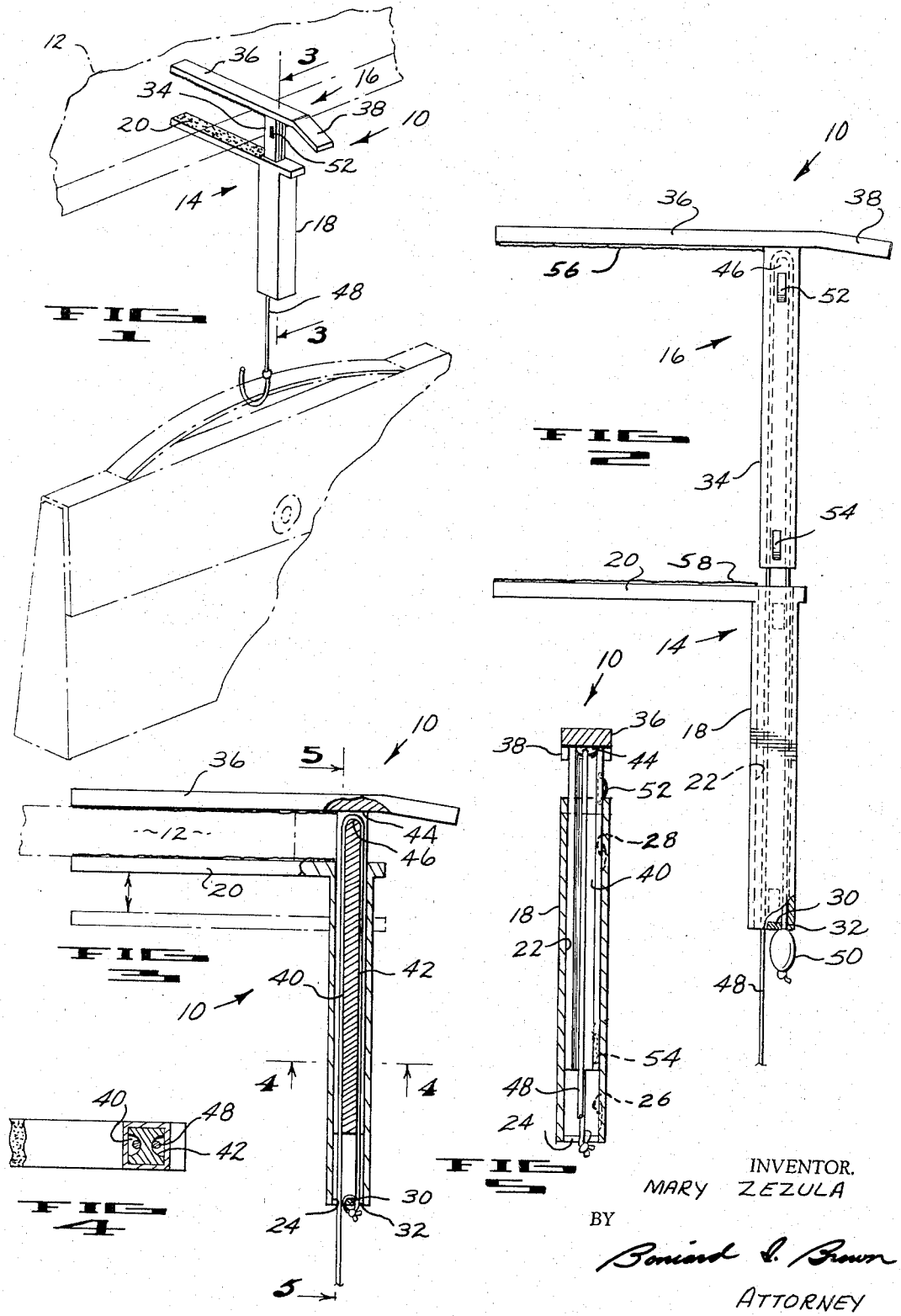
INVENTOR.
MARY ZEZULA
BY
Bernard J. Brown
ATTORNEY

United States Patent Office 3,376,006
Patented Apr. 2, 1968

3,376,006
SUSPENSION CLAMP DEVICE
Mary Zezula, 889 E. Monterey, Pomona, Calif. 91766
Filed Sept. 19, 1966, Ser. No. 580,253
11 Claims. (Cl. 248—227)

The present invention relates generally to suspension clamp devices; more particularly, the invention relates to a suspension clamp device which is adapted for ready attachment to and detachment from a support to suspend articles such as handbags.

The suspension clamp device of the present invention is readily attachable to and removable from a support, such as a table, counter, chair or the like, for the suspension of a handbag or other article in an accessible position, in order to free a person's hands. The device is contractible into a compact configuration for convenient carrying, as in a handbag, handling and storage.

Briefly described, the suspension clamp device, in its simplest form includes a body member having a transversely extending clamping jaw, a second member having a second transverse clamping jaw extending therefrom and having pulley means, the second member being in slidable relation with the body member. A cord is attached to the body member and extends upwardly about the pulley means and downwardly, a depending end portion of the cord extending below the second member. With an article suspended from the depending end portion of the cord, the first and second clamping jaws are urged toward each other by the action of the cord at its attachment with the body member and upon the pulley means, to clamp the jaws about a support such as a table edge to suspend the article from the support.

In the preferred embodiment herein described, the body member and the second member or slide member are in telescoping relation, the slide member being telescopically receivable in the body member to provide a compact unit for carriage and handling. Spaces are defined between the body and slide members on sides of the slide member, through which spaces the cord, which is disposed about the pulley means, extends. In this preferred form, the pulley means constitutes a rounded upper end portion on the slide member. There is preferably provided an actuating grip ear which extends from the slide member oppositely from the upper clamping jaw, to provide means for manual grasping to facilitate the separation of the clamping jaws and the contraction thereof. Detent means are preferably provided to retain the slide member and body member in contracted relation until urged apart manually with sufficient force to overcome the detent means.

It is therefore an object of the present invention to provide a new and improved clamp device for suspending articles such as handbags from supports.

An object of the invention is the provision of a suspension clamp device which is simplified and economical to manufacture, and reliable for its intended purpose.

An object of the present invention is to provide a suspension clamp device which is readily and conveniently attachable to and removable from a support, such as a table, for suspending an article such as a handbag to leave a person's hands free.

It is an object of this invention to provide a suspension clamp device wherein the gripping or clamping action of the device on a support increases in proportion to the weight of the object suspended from the device.

An object of the invention is the provision of an improved clamp device according to the foregoing objects which is contractible for convenient storage and carriage, as in a woman's handbag.

An object of the present invention is to provide a suspension clamp device according to the foregoing object, wherein detent means maintain the device retracted during handling and carrying.

Other objects, features and advantages of the present invention will become apparent to those versed in the art from a consideration of the following description, the appended claims and the accompanying drawings, wherein:

FIGURE 1 is a perspective view, showing a preferred embodiment of the suspension clamp device of the present invention in operative relation with the device clamped to a table edge and suspending a handbag, the table edge and handbag being shown in phantom outline;

FIGURE 2 is an elevational view, showing the suspension clamp device of FIGURE 1 with the body and slide members separated;

FIGURE 3 is an elevational view, partially in section, taken at line 3—3 in FIGURE 1;

FIGURE 4 is a sectional view taken at line 4—4 in FIGURE 3; and

FIGURE 5 is a sectional view taken at line 5—5 in FIGURE 3.

Referring to the drawing, a preferred embodiment of the suspension clamp device 10 is shown in FIGURE 1 in engagement with a supporting edge portion 12 of a table or counter top. The device 10 includes a first member or body member 14 and a second member or slide member 16, which are adapted for sliding or telescoping engagement, as shown.

The first member 14 includes a rectangular body or sleeve 18 and a first or lower flat clamping jaw or arm 20 extending perpendicularly from the top portion of body 18. A longitudinal bore 22 of rectangular cross-section extends through the body 18 and has a lower opening 24. Within the bore and adjacent the respective ends thereof arcuate detent recesses 26, 28 are provided for a purpose which is hereinafter explained. An end wall 30 extends partially across opening 24 and defines a cord passage 32, as shown in FIGURES 2 and 3.

The second member 16 comprises a slide member 34 and a second or upper clamping jaw or arm 36 extending at right angles from the upper portion of the slide member. The clamping jaw 36 has a rearwardly extending actuating grip or ear 38 which is adapted for manual grasping for a purpose which is hereinafter described.

The slide member 34 is of generally rectilinear cross-section and is configured to be telescopically slidable in the bore 22 of the body 18. The slide member is no longer than the body member and is preferably somewhat shorter, in order that it may be completely housed within the body 18 when the first and second sections are in their telescopically contracted configuration.

As shown in FIGURES 3, 4 and 5, the slide member 34 has longitudinally extending grooves 40, 42 on its opposite sides, these grooves or channels being arcuate in cross-section, as shown in FIGURE 4. Grooves 40 and 42 are joined by a passage 44 defined between the clamp arm 36 and a rounded pulley portion 46 of the slide member. There is defined a continuous cord groove of arcuate cross-section which extends along opposite sides and about the upper end of the slide member.

A pulley cord 48 is slidably disposed in the pulley groove defined by the grooves 40, 42 and in the rounded pulley portion 46 of the slide member. A stop element 50 is secured as by tieing at the end of the pulley cord portion which extends through the opening 32 in end wall portion 30, as indicated in FIGURE 2. As indicated in FIGURES 4 and 5, this cord end portion may be tied to the end wall 30 in the manner shown, instead of utilizing a stop element.

Detent leaf spring elements 52 and 54 are mounted in respective recesses adjacent to the respective ends of the slide member 34, and are adapted to engage in the correspondingly configured recesses 26 within bore 22 of the body 18, thereby providing detent means for releasably securing the body 18 and slide member 34 in their telescopically contracted configuration, and in the case of detent spring 52 to serve the purpose of releasably securing the slide member 34 from disengagement from the body member 18 when the clamping jaws are pulled relatively widely apart during handling and/or during the attachment operation. It will be appreciated that the detent means serve to prevent the first and second sections from coming apart during storage and handling, thereby eliminating the annoyance and time consumption of reassembling the sections and disentangling the cord, which would be involved if the sections became separated. Exertion of sufficient manual force overcomes the resilient detent action of the detent springs to permit relative movement of the first and second sections.

The confronting or clamping surfaces of the parallel clamping jaws 20 and 36 are preferably provided with friction material layers 56, 58, which are formed out of such material as rubber or Teflon, in order to provide an improved gripping action.

In utilizing the suspension clamp of the inevntion, the upper and lower jaws 36, 20 are separated by exerting sufficient force to overcome the retaining force of the detent springs 52, 54. The upper jaw 36 is positioned above a support, such as a table edge, or counter edge, and lower jaw 20 is positioned below this support. The article to be suspended, such as a handbag, is attached to the depending end of the cord 48, as by means of a hook, as shown in FIGURE 1.

The aforementioned separation of the clamping jaws, the positioning of the jaws relative to the support and the attaching of the article or handbag are quickly and conveniently accomplished by grasping actuating ear 38 and body 18 to separate and position the clamping jaws with one hand while attaching the handbag with the other hand.

The clamping jaws 36, 20 are urged toward each other in a gripping action upon the support 12 by the weight of the handbag or article at the depending free end of the cord. The weight of the handbag pulls the cord 48 about the curved pulley portion 46 of the slide member 16, thereby urging the slide member and upper clamping jaw 36 downwardly by the force exerted by the cord on pulley portion 46, while body member 14 and lower clamping jaw 20 are urged upwardly by the upward force of the cord at its attachment to the lower end of the body member at the stop member 50 (FIGURE 2) or the knot (FIGURE 3).

Firm gripping or clamping action is thus exerted on the support to provide firm, reliable support. The gripping action of the suspension clamp device increases in accordance with the weight of the suspended article, as will be appreciated from the drawing and from the geometric relationships of the parts.

As indicated in FIGURES 1, 2 and 3, the support-engaging surfaces of the clamping jaws 20, 36 are preferably covered by a layer of a suitable friction material, such as rubber or Teflon, secured thereto as by adhesive, to provide improved frictional gripping action.

With the handbag or other article suspended from a table edge or counter edge by means of the suspension clamp device, the hands of the user are free for dining, examining goods at a counter, making transactions, etc.

To remove the clamp device from the support, the handbag or article is removed from the end of the cord 48, while the clamping jaws are urged apart by manual grasping of actuating ear 38 and body member 18. The actuating ear is grasped and raised to move the upper jaw from the support, the device is moved away from the support, and slide member 16 is urged telescopically into the body member, thereby contracting the device into a very compact unit which is well-adapted for storage, handling and carrying, as in a handbag.

The clamping device is retained in contracted configuration by the detent springs 52, 54 which engage cooperating recesses in the body member to releasably secure the body and slide member together in contracted relation during handling, carrying and storage. The two members are prevented from coming apart, thereby minimizing cord tangling, thus eliminating nuisance, time consumption and inconvenience.

Those versed in the art will appreciate that the present invention achieves the objects and realizes the advantages hereinbefore mentioned.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. A suspension clamp device comprising:
   a first member having a first clamping jaw extending therefrom,
   a second member in slidable relation with the first member and having a second clamping jaw extending therefrom,
   pulley means on the second member,
   and a cord extending from a point of attachment on the first member upwardly about said pulley means and downwardly therefrom with a depending end portion,
   whereby upon suspension of an article from said depending cord end portion the first and second clamping jaws are urged toward each other to clamp about a support to suspend the article from the support.

2. A suspension clamp device according to claim 1, wherein said pulley means comprise a rounded upper end portion of the slide member.

3. A suspension clamp device according to claim 1, wherein said slide member is telescopically receivable in the body member in a retracted position wherein the upper clamping jaw is immediately adjacent the lower clamping jaw.

4. A suspension clamp device comprising:
   a body member having an opening therethrough,
   a first clamping jaw extending transversely from the body member,
   a slide member slidably mounted in said opening of the body member,
   a second clamping jaw extending transversely from the slide member,
   pulley means on the slide member,
   and a cord attached to the body member and extending in said opening and about said pulley means on the slide member and downwardly therefrom with a depending end portion,
   whereby upon suspension of an article from said depending cord end portion the first and second clamping jaws are urged toward each other to clamp about a support to suspend the article from the support.

5. A suspension clamp device according to claim 2, wherein said pulley means comprises a rounded upper end portion of the slide member.

6. A suspension clamp device according to claim 4, wherein said slide member is telescopically receivable in the body member in a retracted position wherein the upper clamping jaw is immediately adjacent to the lower clamping jaw.

7. A suspension clamp device according to claim 4, and further including an actuating grip ear extending from the slide member in a direction opposite from the upper clamping jaw.

8. A suspension clamp device comprising:
an elongated vertical body member having a longitudinal opening therethrough,
a lower clamping jaw extending transversely from the upper portion of the body member,
a slide member telescopically received in said body member opening,
an upper clamping jaw extending transversely from the slide member,
pulley means on the upper portion of the slide member,
means defining spaces between the body and slide members on two respective sides of the slide member,
and a cord having an end portion secured against upward movement relative to the body member and extending through said spaces and about said pulley means and having a depending end portion,
whereby upon suspension of an article from the depending cord end portion the upper and lower clamping jaws are urged toward each other to clamp about a support to suspend the article from the support.

9. A suspension clamp device according to claim 8, wherein said pulley means comprises a rounded upper end portion of the slide member, wherein said spaces between the body member and the slide member are defined by grooves on respective sides of the slide member, and
wherein said rounded upper end portion is continuous with the walls of said grooves.

10. A suspension clamp device according to claim 8, and further including spring detent means operable to retain the slide member against movement relative to the body member and releasable to permit such relative movement.

11. A suspension clap device according to claim 8, and further including friction means on the clamping jaws to provide improved gripping action.

References Cited

UNITED STATES PATENTS 2,006,897  7/1935  Kirkland et al. _____ 248—226
2,920,369  1/1960  Zezula _____ 248—226

FOREIGN PATENTS 176,594  3/1922  Great Britain.

ROY D. FRAZIER, *Primary Examiner.*

ROBERT P. SEITTER, *Assistant Examiner.*